Nov. 29, 1949 M. SEUTIN 2,489,506
MULTIPLE MIRROR DEVICE HAVING
OPPOSITELY PIVOTED END MIRROR

Filed Oct. 17, 1946 2 Sheets-Sheet 1

INVENTOR
Maurice Seutin
By Robert E. Burns
ATTORNEY

Nov. 29, 1949  M. SEUTIN  2,489,506
MULTIPLE MIRROR DEVICE HAVING
OPPOSITELY PIVOTED END MIRROR

Filed Oct. 17, 1946  2 Sheets-Sheet 2

INVENTOR
Maurice Seutin
By Robert E. Burns
ATTORNEY

Patented Nov. 29, 1949

2,489,506

UNITED STATES PATENT OFFICE 2,489,506

MULTIPLE MIRROR DEVICE HAVING OPPOSITELY PIVOTED END MIRROR

Maurice Seutin, Fresnes-sur-Escaut, France

Application October 17, 1946, Serial No. 703,815
In France March 11, 1939

1 Claim. (Cl. 88—84)

The present invention relates to mirrors, and more particularly to a multi-faced mirror.

The object of this invention is to provide a multi-face mirror designed to enable the user to conveniently view the rear portions of his head and his back.

Another object of this invention is to provide a multi-face mirror having a stationary mirror and a swingable mirror, a stationary frame bearing said stationary mirror pane, and a swingable frame one end of which is pivoted to one end of the stationary frame while the other end of the swingable frame carries the swingable mirror pivoted thereto.

Preferably, another swingable mirror is pivoted to the stationary frame on the other side of the stationary mirror pane. In this case the mirror comprises three mirror panes, the stationary mirror being flanked by the two swingable mirrors.

Preferably, the mirror as a whole is so designed that the three panes can be brought into adjacent relationship, with no free space therebetween, in the plane of the longer frame, thus providing one continuous unit of balanced proportions. For that purpose, the individual frames of the three panes are so dimensioned that in association with the movable outer frame they will provide a coherent and regular assemblage as shown in the appended drawing wherein an embodiment of the subject-matter of this invention is illustrated for the mere purpose of exemplification.

Figure 1:
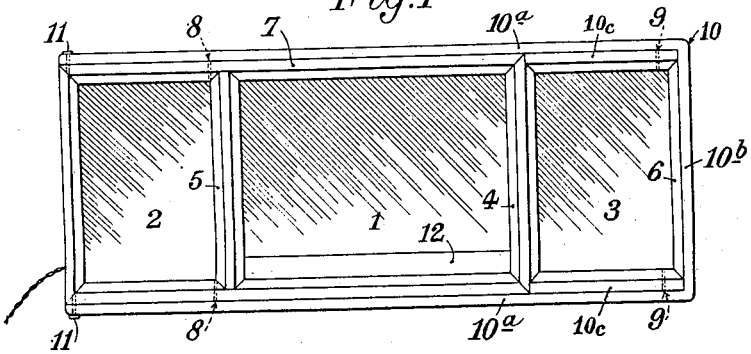
Figure 1 is a front elevational view of the mirror whose three panes have been brought into the same plane.
Figure 2:
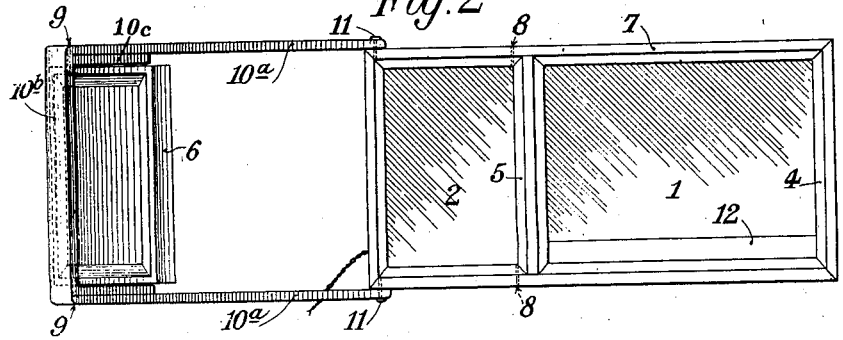
Figure 2 is an elevational view illustrating the same mirror in its extended position.

The mirror comprises a fixed median pane 1 and two side panes 2 and 3, all of said panes having the same height and the middle one being about twice as wide as the others.

Each glass pane is surrounded by its own frame 4, 5 or 6 made of wood, metal or any other suitable material, the elements of said frames having a uniform width.

The frame 4 of the stationary pane is fixed within a twinning frame 7 so dimensioned that the whole of frames 4 and 5 are exactly contained therein; said twinning frame 7 is adapted to be provided with suspension or other suitable means to attach it to a wall.

Figure 3:
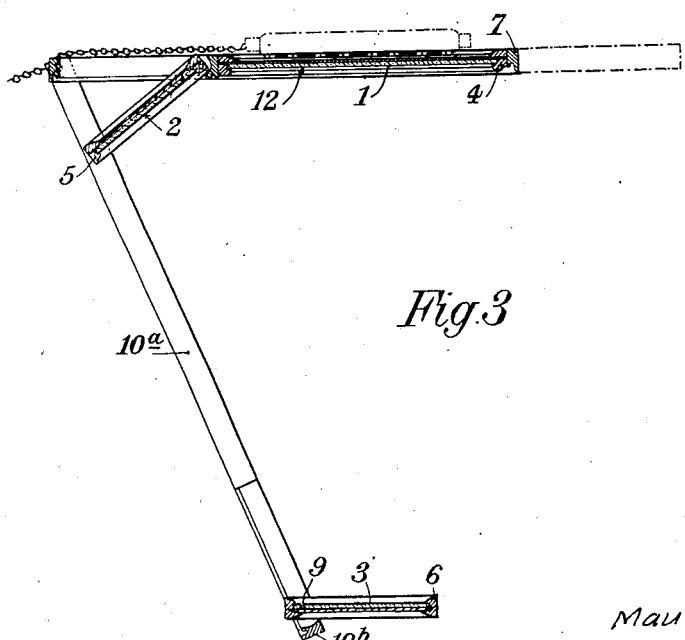
Figure 3 is a horizontal cross-sectional view in relation with another extended position.

The frame 5 is mounted in the twinning frame 7 by means of pins 8 arranged on a vertical axis and positioned adjacent to the frame 4 to set the pane 2 at any desired angle with respect to pane 1, for instance as shown in Fig. 3.

The frame 6 is fulcrumed by means of pins 9 within an outer frame 10 which, in this example, comprises a pair of horizontal bars 10a and one single vertical bar 10b. The pins 9 are located at the ends of the bars 10a adjacent to the bar 10b, while the other ends of said bars 10a are fulcrumed on the twinning frame 7 by means of pins 11.

The height of the swingable frame 10 is such that the horizontal bars 10a enclose exactly those of the twinning frame 7, and its breadth is such that the frame 6 fits between frame 4 and the vertical bar 10b (Fig. 1).

In order to close the spaces between the frame 6 and the horizontal bars 10a, bars 10c are secured to the latter and positioned in alignment with the horizontal bars of the twinning frame 7 in the extended position of the mirror. The bars 10c also reinforce the bars 10a.

As may be seen in Figure 1 the combination of the three panes with their frames thus forms a unitary structure without open spaces.

When the user desires to use the mirror to view the rear portions of his head or his back he will swing the frame 10 about the pins 11 and turn the pane 3 about the pins 9 so as to bring said pane 3 to a position substantially parallel with pane 1 and in front of the same as shown in Fig. 3. He can also set the frame 10 and pane 3, as well as pane 2, in other positions depending on whether he intends to have a side or a three-quarter front sight of himself, etc.

By reason of the comparatively large distance between the fulcrum pins 9 and 11 the user has freedom of movement between the mirror panes, e. g. to put his or her hair in order.

In order to provide for good illumination, a ground glass such as 12 may be combined with the fixed pane 1 and even with the other panes, and an incandescent tube or any other suitable electric lighting apparatus with or without a reflector may be arranged therebehind.

Of course, the dimensions and proportions of the panes and frames thereof as well as the details of construction of the same can be varied, and blocking means or like desirable attachments can be added without thereby departing from the scope of this invention. In particular, four or more panes instead of three can be combined in the same manner.

Figure 4:
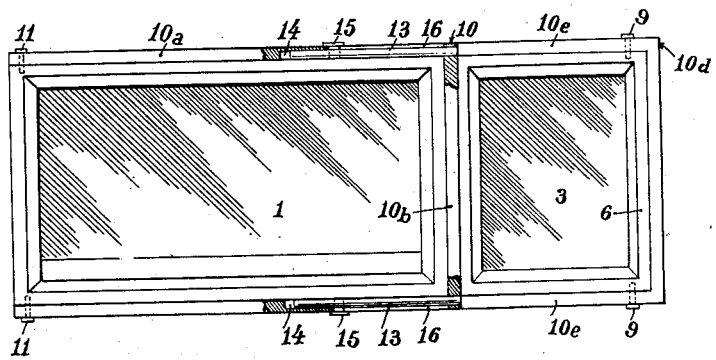
Figure 4 is a partly elevational and partly sectional view of a two-pane mirror provided with sliding arms.
Figure 5:
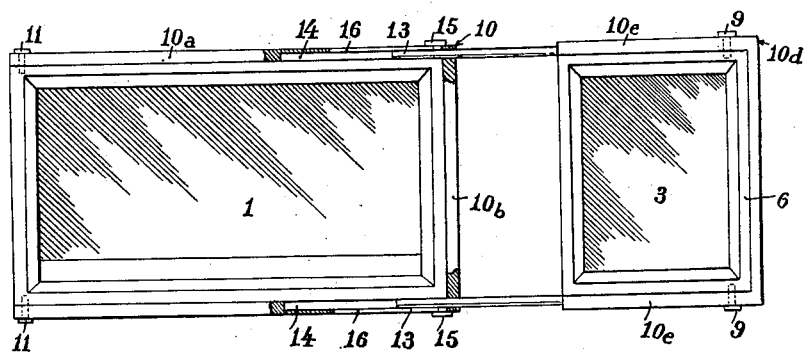
Figure 5 is a view similar to Fig. 4 and shows the mirror in extended position prior to its angular setting.

Figs. 4 and 5 illustrate an exemplary embodiment of such an arrangement in which the outer frame 10 with its horizontal sides 10a and its vertical side 10b fits about the fixed frame 7 and is pivoted at 11 as previously described.

The pane 3 mounted in its frame 6 and pivoted at 9 is rigid with a frame 10d providing an extension of frame 10 and independent thereof. Each of the sides 10e of the frame 10d carries a sliding arm 13 which is slidable in grooves 14 provided in the sides 10a of the frame 10.

The pane 3 can thus be moved away from pane 1 as illustrated in Fig. 5, the movement of the pane being limited by a stop 15 on arm 13 slidable in a groove 16 in side 10a.

Thus, with the aid of the sliding arms 13 providing extensions of the horizontal sides 10a, the user who has set the looking glass so that he is able to see his nape or back, is entirely free to move easily between the looking glasses 1 and 3.

In retracted position the combination of the twin looking-glass with the framing thereof appears as a perfectly continuous whole.

It should be understood also that the frame on whose end the second movable looking glass is pivoted may be designed in any suitable manner, e. g. as a pair of lazy-tongs, articulated arms or the like, whereby said movable looking glass can be moved a suitable distance away from the stationary looking glass and from the other movable looking glass pivoted on the latter.

What I claim as my invention and desire to secure by Letters Patent is:

A composite multiple faced mirror comprising a central mirror and two end mirrors, all of the mirrors being the same height and the two end mirrors being alike and about half the length of the central mirror, a rectangular frame extending around and closely embracing the central mirror and one of the end mirrors, the central mirror being fixedly mounted in said frame to swing about an axis extending transversely of the frame and located adjacent the contiguous end of the central mirror, a three sided outer frame embracing all three mirrors disposed contiguously to one another in a common plane, said outer frame comprising upper and lower frame portions and one side frame portion, the other side being open, the open ends of the upper and lower frame portions being pivotally connected to said rectangular frame adjacent the outside edge of the end mirror mounted in said latter frame, the second end mirror being closely embraced in and pivotally mounted in the closed side portion of the three sided outer frame to swing about an axis extending transversely of said frame adjacent the closed side thereof, whereby the three sided outer frame and the two end mirrors are swingable about their respective pivots from a position in which all three mirrors are in a common plane and face in the same direction, with the two end mirrors disposed contiguous to and at opposite ends of the central mirror, to a position in which one end mirror is adjacent an end of the central mirror but at an angle thereto while the second end mirror is in front of and is spaced a substantial distance from and faces the other two mirrors.

MAURICE SEUTIN.

REFERENCES CITED

The following references are of record in the file of this patent:

UNITED STATES PATENTS

| Number | Name | Date |
|---|---|---|
| 312,568 | Lynch | Feb. 17, 1885 |
| 365,183 | Hufeland | June 21, 1887 |
| 382,291 | Bay | May 8, 1888 |
| 707,151 | Moss | Aug. 19, 1902 |
| 751,290 | Jaeger | Feb. 2, 1904 |
| 1,593,246 | De Haven | July 20, 1926 |
| 1,748,034 | Blackman | Feb. 18, 1930 |

FOREIGN PATENTS

| Number | Country | Date |
|---|---|---|
| 825,753 | France | Mar. 14, 1938 |
| 851,493 | France | Oct. 2, 1939 |